United States Patent [19]

Schlueter et al.

[11] Patent Number: 5,970,915

[45] Date of Patent: Oct. 26, 1999

[54] METHOD OF PREPARING A LITTER BOX FOR SMALL DOMESTIC FELINES

[75] Inventors: Daniel M. Schlueter, Victoria; Russell D. Schlueter, Norwood Young America, both of Minn.; Robert S. Moberg, Placentia, Calif.

[73] Assignee: Harvest Ventures, Inc., St. Bonifacius, Minn.

[21] Appl. No.: 09/227,423

[22] Filed: Jan. 8, 1999

[51] Int. Cl.⁶ .................................................. A01K 29/00

[52] U.S. Cl. ............................................................ 119/171

[58] Field of Search .................................... 119/171, 172, 119/173

[56] References Cited

U.S. PATENT DOCUMENTS

| | | | |
|---|---|---|---|
| 4,085,704 | 4/1978 | Frazier | 119/171 |
| 4,744,374 | 5/1988 | Deffeves et al. | 119/171 |
| 5,044,325 | 9/1991 | Miksitz | 119/171 |

*Primary Examiner*—Thomas Price
*Attorney, Agent, or Firm*—Haugen Law Firm PLLP

[57] ABSTRACT

An improved system for preparation and utilization of a litter box for use by small domestic animals which utilizes a litter material of macroporous silica gel in granular form, with the particle size ranging from between about 1 millimeter to about 10 millimeters, and with a moisture content below about 15%. Advantageously, the receptacle for retaining the litter is treated with a thin film of disinfectant prior to introduction of litter material.

4 Claims, No Drawings

METHOD OF PREPARING A LITTER BOX FOR SMALL DOMESTIC FELINES

BACKGROUND OF THE INVENTION

The present invention relates generally to an improved system and method for preparing a litter box for use by small domestic feline animals particularly cats, the box providing a highly desirable litter material which is not only highly absorbent for water and urine, but which is also effective for the elimination of odors from the waste. The treatment of the container for the litter enhances the effectiveness of the litter and reduces the build up of bacteria which would otherwise be present in the litter and its surrounding container and environment.

In the past, litter boxes for domestic felines such as cats were typically filled with pulverulent solids or granules such as sand or the like. While such materials have been generally effective, they suffer from the disadvantage of being only modestly absorbent, and fail to be effective for elimination of odor. These materials are not effective for elimination or reduction of bacteria and live viruses which may otherwise be present and indeed thrive in the used litter. The present invention overcomes certain of these disadvantages by virtue of the ability of the improved litter system to absorb water and moisture from the urine, and also effectively eliminate odors created from the waste. Furthermore, felines find the material workable for their feet and pads, and do not find the litter material and the accompanying disinfectant to be undesirable.

In the past, systems and facilities for providing litter for domestic cats and the like have generally included sand as the base material. However, such materials have been generally considered unsatisfactory and uncomfortable to domestic casts for their ongoing use, due in particular to the compacting nature of a pack of sand, and the resulting inability to release the entrained moisture to the ambient.

SUMMARY OF THE INVENTION

In accordance with the present invention, a highly absorbent silica gel which is generally in granular or particulate form, generally spheroid in configuration, and highly porous. In this connection, the silica gel is known as macroporous silica gel with the granules having a diameter ranging from between about 1 and 10 millimeters. Such macroporous silica gel materials are commercially available. Prior to filling the litter box with the silica gel litter material, a thin film of a disinfectant is applied to the interior surface of the box or container contacting the litter. Once this is in place, the macroporous silica gel fill is provided, and the litter box is ready for utilization.

Macroporous silica gel is generally white or milk-like in color. It is highly absorbent and extremely effective in absorbing urine from domestic cats. It is also helpful and effective in encapsulating fecal material so as to make it more accessible to a scoop for removal. The disinfectant applied to the inner surface of the container is preferably one containing the active ingredients, such as:

| | |
|---|---|
| Alkyl (50% C14, 40% C12, 10% C16) Dimethyl Benzyl Ammonium Saccharinate | 0.1% |
| Ethanol | 79.0% |
| Inert ingredients | 20.9%. |

Such disinfectants are commercially available. One such disinfectant is available under the trade designation LYSOL® in aerosol form from Linden Corporation of Wilmington, Del. Application of the material to the interior confines of the litter box is straightforward, with a thin film generally being the more desirable. Because of the highly porous nature of the macroporous gel, the disinfectant, because of its volatile active constituents, is effective in impregnating the film material contained in the litter box.

Therefore, the steps involved in preparing the litter box include providing a clean litter box in the form of a receptacle with a closed bottom and a plurality of interconnected generally upstanding side walls, thus forming an open top container with an inner surface. The film of disinfectant is applied to the inner surface, and the macroporous silica gel granules are thereafter loaded into the container at the desired depth. Thereafter, the litter box is ready for use.

Therefore, it is a primary object of the present invention to provide an improved litter box for domestic felines such as cats, which utilizes granules of macroporous silica, with the inner surfaces of the box being initially coated with a film of a disinfectant, preferably one containing dimethyl benzyl ammonium saccharinate as its active ingredients.

It is a further object of the present invention to provide an improved litter box for domestic cats, wherein the interior of the container forming the box is coated with a film or layer of a disinfectant, and thereafter filled with macroporous silica gel granules.

Other and further objects of the present invention will become apparent to those skilled in the art upon a review of the following specification and appended claims.

DESCRIPTION OF THE PREFERRED EMBODIMENT

In accordance with the preferred embodiment of the present invention, a conventional litter box receptacle is selected, cleaned, and provided with a thin film or coating of a disinfectant, preferably a disinfectant containing dimethyl benzyl ammonium saccharinate as its active ingredients. After applying the film, the box is filled with a quantity of macroporous silica gel, generally to a depth of approximately 2 to 3 inches, and the system is then ready for use.

Among the advantages flowing from the use of macroporous silica granules are the fact that the material is an ideal desiccant, and is nontoxic and nonflammable. It has been found to be non-irritating to the pads of the cats utilizing the material. It is stable and inert, thus making it possible for disposal in landfills according to federal, state and local regulations.

As indicated, the granules preferably have a spherical configuration with a diameter of from 1 to 10 millimeters. The bulk density of the macroporous silica gel is generally between about 400 and 500 grams per liter (the water absorption capacity is generally up to about 85%). In order to render the material more highly effective, it is preferably dried to a point where it contains less than about 15% water. This prevents cracking of the individual spherical granules due to moisture content. Also, as indicated above, the loosely packed macroporous silica gel granules provide an appropriate medium of transmission of vapors ladened with the disinfectant throughout the entire bulk of the material. This is a desirable feature and is not available from previously-utilized materials such as sand which has a strong tendency toward compaction and agglomeration.

It will be appreciated that the specific example given herein is for purposes of illustration only, and the invention is limited thereby.

We claim:

1. The method of preparing a litter box for use by small domestic feline animals such as cats which includes the steps of:
   (a) selecting a receptacle with a closed bottom, a plurality of interconnected generally upright side walls forming an open top and defining an inside surface;
   (b) applying a film of a disinfectant to said inside surface;
   (c) selecting a litter material of macroporous silica gel in granular solid form, with the litter material consisting essentially of granules having an average size of from about 1 millimeter to 10 millimeters, and with a moisture content below about 15%; and
   (d) loading said disinfectant coated receptacle with a fill of said selected litter material.

2. The method of claim 1 wherein the disinfectant consists of the formulation having active ingredients of: alkyl (50% C14, 40% C12, 10% C16) and dimethyl benzyl ammonium saccharinate in a concentration greater than about 0.1%.

3. The method of claim 1 being particularly characterized in that the granules forming said litter have a bulk density of between about 400 and 500 grams per liter.

4. The method of claim 1 being particularly characterized in that the cross-sectional thickness of the fill of said litter material in said litter box is at least about 50 millimeters.

* * * * *